Aug. 22, 1944.  P. DESERNO  2,356,510
ARRANGEMENT FOR MEASURING FREQUENCY CHARACTERISTICS
Filed Sept. 6, 1940
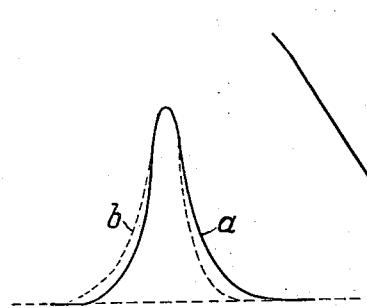
Fig.1
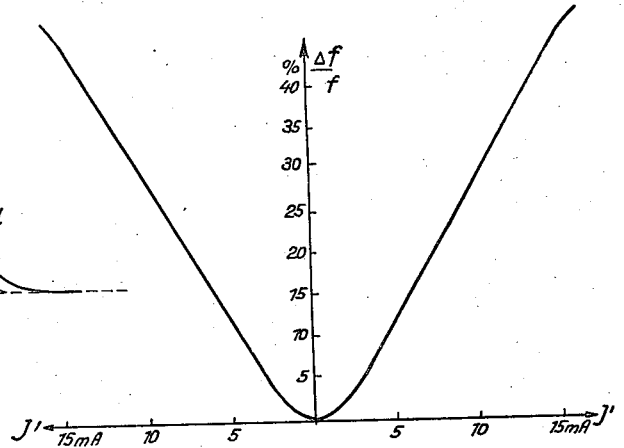
Fig.2
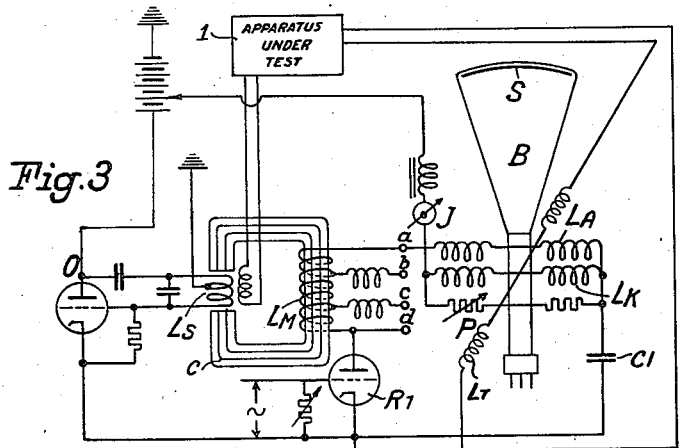
Fig.3
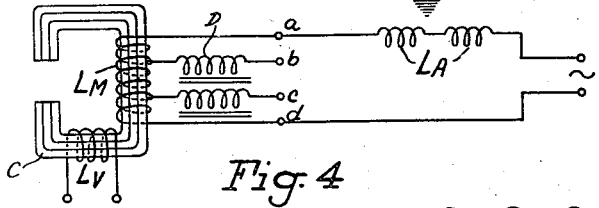
Fig.4
Fig.5
Inventor:
Peter Deserno
by
Att'y Patented Aug. 22, 1944

2,356,510

UNITED STATES PATENT OFFICE 2,356,510

ARRANGEMENT FOR MEASURING FREQUENCY CHARACTERISTICS

Peter Deserno, Berlin, Germany; vested in the Alien Property Custodian

Application September 6, 1940, Serial No. 355,599
In Germany September 9, 1939

4 Claims. (Cl. 175—183)

This invention relates to devices for testing the frequency characteristic of electrical devices and consists in certain features of novelty which are described hereafter in connection with the drawing, in which Fig. 1 shows oscillographic indications referred to in explaining prior arrangements; Fig. 2 is a graph that serves to explain the function of another kind of prior device and also serves to disclose the idea of the present invention; Fig. 3 is a diagram representing one embodiment of the invention; and Fig. 4 is a fragmentary diagram showing a modification of the arrangement illustrated in Fig. 3.

Fig. 5 is a diagram indicating the wave forms of the currents through rectifying tube $R_1$, deflecting coils $L_A$ and $L_E$ and device J.

Many electrical devices manufactured in large quantities are tested and adjusted by observing their frequency characteristics. The testing devices used usually record the frequency characteristic directly upon the screen of a cathode ray tube, by employing to this end a periodically varying frequency potential supplied by the testing set. This set applies to the sweep circuit deflectors of the cathode ray tube a potential which varies in magnitude synchronously with the variation of frequency. Further, this set applies to the input side of the device to be tested a potential which has the predetermined frequency variation but substantially constant amplitude. The instantaneous output potential or current of this device under test varies with the variation in applied frequency, according to its frequency characteristic. This output potential of the device being tested is applied to the test circuit deflectors of the tube, to afford a test deflection perpendicular to the sweep deflection, to present on the screen of the cathode ray tube a visible image of the frequency characteristic of the device under test.

In such testing devices the sweep or time base axis of the cathode ray tube is usually marked with indications designating the respective frequencies.

It is desirable that increments in frequency be proportional to corresponding increments of distance along the time base axis, so as to represent observed characteristics as conventionally graphically as possible. A frequency scale, however, that involves such proportionality is not easy to produce, as is explained in the following.

Such a test device includes a high frequency generator or oscillator, adjustable in frequency generally by means of a variable condenser. If the condenser which controls this frequency, as well as the time base generator, has the usual sinusoidal capacity variation common in simple test units a distorted frequency scale results. This distortion is due to the non-linear proportionality between frequency and capacity, as can be seen by the formula $$f = \frac{1}{2\pi\sqrt{LC}}.$$

As a result, the scale is crowded at one end, and the curve is not a conventional illustration of the frequency characteristic. It appears, therefore, that in order to produce an undistorted curve, this distorted frequency scale must always be taken into consideration. The magnitude of distortion due to the non-linear relationship of frequency to capacity may be seen from Fig. 1, in which curve $a$ is representative of a typical resonance curve on a linear scale, while $b$ represents the same resonance curve on a distorted scale.

In other devices frequency variation may be produced by inductance variation. For instance, the frequency of an oscillator in which the coil of the oscillatory circuit has a core of high frequency iron, may be greatly varied by polarizing the high frequency iron to different degrees. To such end the high frequency iron is preferably arranged in the iron core C of a low frequency choke which is then more or less efficiently energized by an alternating current or a pulsating uni-directional current. The frequency of the high frequency generator then varies with the fluctuations of such energization.

Fig. 2 is a plot of percent change in frequency against deflection current and illustrates the interdependence between the energizing current and testing frequency of an arrangement of the latter type, in which frequency variation is obtained from inductance control. As will be seen, the curve here shown is substantially rectilinear within a large region, that is to say, percent frequency variation increments are proportional to corresponding current variation. In spite of this seeming linearity, a linear frequency scale may not be traced on the screen of the cathode ray tube, firstly because it is very difficult, on account of the time constant $$\frac{L}{R}$$

of the coils, to obtain a rectilinear rise of current, and then the deflecting voltage and current variation in the choke C must be produced by electron tubes O and $R_1$. The curvature of the characteristic curves of these tubes renders it almost impossible to avoid distortion. In addition, phase distortion may be present and effective to a considerable extent.

In order to do away with all these sources of error and thereby to obtain a linear frequency scale it is proposed by the invention that the variation of the testing frequency and the time base deflection of the beam be effected by the same current. The deflection in the direction of the time base is here effected magnetically, that is, in a manner not usual with testing arrangements.

Since the sweep or time base deflection A on the screen of the cathode ray tube and the percentage frequency change $$\frac{\Delta f}{f}$$

of the high frequency generator (straight portion of the curve of Fig. 2) are both proportional to the current, J', the proposed arrangement will necessarily cause proportionality between deflection and frequency. We may thus express the following, relating deflection to frequency:

$$A = C_1 J'$$

and $$\frac{\Delta f}{f} = C_2 J'$$

where $C_1$ and $C_2$ are proportionality constants. From these relations it follows that $$\frac{\Delta f}{f} = \frac{C_2}{C_1} \cdot A$$

as will be clear.

In Fig. 3, which shows an arrangement for effecting the invention, $L_s$ denotes the inductance of the oscillatory circuit forming part of an oscillator O, this inductance having to be varied to effect a frequency change. Coil $L_s$ is arranged in the gap of high frequency iron core C which serves as the core for magnetizing coil $L_M$. The variation in flux, as energization of coil $L_M$ is varied, affects coil $L_s$ to produce the desired frequency variation. Deflection coils $L_A$ provide sweep deflection of the cathode ray beam of tube B. The A. C. supply is applied in the normal manner between the grid and cathode of tube $R_1$ allowing pulsating direct current of the form shown in Fig. 5 to be supplied from a D. C. source through the plate-cathode circuit of this tube. The direct current component of the pulsating direct current traverses coils $L_M$, $L_A$ and $L_K$, the current through $L_K$ being adjustable at P to center properly the cathode ray beam, as is described in more detail later. The alternating component of the current does not traverse $L_K$ but instead is by-passed by condenser $C_1$ so that this component may serve to cause periodic timed deflection of the cathode ray beam. The current for feeding both the deflecting coil $L_A$ and the magnetizing coil $L_M$ is controlled by the electron tube $R_1$. In this connection the current variation need not be in the nature of a special curve, such as a sine curve or a saw-tooth curve, the frequency variation $\Delta f$ being in any case proportional to the deflection A, as will appear from the equation hereinbefore deduced. The aim, of course, should be to have a fairly constant rise of current in order to insure that the indicating speed in the cathode ray tube and hence the brightness of the record be likewise constant. In a given case the brightness of the cathode ray tube might be controlled in dependence on the indicating speed. The apparatus under test I, is coupled to the output of oscillator O and the output from this apparatus is applied to deflecting coils $L_T$ arranged at right angles to time base deflection coils $L_A$. Indications are produced on the screen S by the cathode ray tube B indicative of the frequency characteristics of the apparatus I.

Fig. 2 indicates that in order properly to utilize the current-percent frequency characteristic, it will be necessary to operate only on the straight portion of the curve. A certain mean current, about which to operate, is therefore required. In accordance with the circuit of Fig. 3 this mean supply current value may be controlled by tube $R_1$. Conceivably, the use of such pulsating direct current may be effective to deflect the beam of the cathode ray tube away from the middle of the screen S thereof. Some compensation means must, therefore, be provided to offset this deflection. In the form shown an additional deflection coil $L_K$ is provided for this purpose and is so dimensioned and connected that the direct current flowing through it will be effective to return a recorded curve to a position generally centrally of the fluorescent screen. A potentiometer P may be provided shunting the $L_K$ winding in order to regulate the central location of the observed image within narrow limits. By varying the direct current amplitude of tube $R_1$ by means of the adjustable resistance as shown the entire frequency range may now be altered without the curve changing its position. In Fig. 5 there is shown diagrammatically the wave forms of the potentials through LK and J.

The frequency range of the testing device is determined by the ampere turns of choke winding $L_M$. In order to provide for altering this range the coil $L_M$ may be fitted with taps, as $a$, $b$, $c$, $d$. When employing the small ranges $b-d$ or $c-d$ it is considered preferable to replace the remainder of coil $L_M$ by a separate inductance connected between the taps $a$, $b$ or $a$, $c$, respectively. This preferred embodiment is shown in Fig. 4 in which deflection potentials may be derived across taps $b$ and $c$, and a separate inductance D is added between terminals $a$ and $b$.

In order to adjust the circuit described to a desired working point, the core C, say in the Fig. 4 arrangement, may be suitably polarized by a biasing direct current supplied to biasing winding $L_V$. It is clear that appropriate control of this biasing direct current will suitably adjust the working point, and furthermore, that such adjustment may also serve to shift the frequency range of the testing device.

J, Fig. 3, denotes a measuring instrument, while J', Fig. 2, indicates the current flowing through this instrument.

What is claimed is:

1. A testing device for recording electrical frequency characteristics of a circuit on the screen of a cathode ray tube by deflection of the beam thereof, comprising a source of periodically varying testing frequency for application to the circuit to be tested, beam deflecting means for connection to the circuit under test, beam deflecting coils for causing a time base deflection of said beam at an angle to the testing deflection, said source including a control coil for controlling the periodic variations of said testing frequency, and pulsating direct current supply means, said beam deflecting coils and said control coil being connected in series with each other and with said pulsating direct current supply means whereby the variations in said testing frequency and said time base deflections are effected by the same current.

2. A device according to claim 1, wherein said source of the said testing frequency includes a coil, taps on said coil, and means connecting the current supply source and associated elements adjustably between certain of said taps, whereby the range of testing frequency may be changed.

3. A device according to claim 1, wherein the means for controlling said testing frequency further comprises taps on said control coil, and inductances connected to these taps.

4. A device according to claim 1, wherein said means for controlling said testing frequency includes a second coil and an iron core common to said control coil and said second coil, each of these coils enabling the range of the testing frequency to be changed.

PETER DESERNO.